United States Patent [19]
Nadim

[11] Patent Number: 5,434,925
[45] Date of Patent: Jul. 18, 1995

[54] ACTIVE NOISE REDUCTION

[75] Inventor: Mohammed Nadim, Colchester, Great Britain

[73] Assignee: Noise Cancellation Technologies, Inc., Linthicum, Md.

[21] Appl. No.: 133,022

[22] PCT Filed: Apr. 9, 1992

[86] PCT No.: PCT/GB92/00642

§ 371 Date: Dec. 6, 1993

§ 102(e) Date: Dec. 6, 1993

[87] PCT Pub. No.: WO92/18975

PCT Pub. Date: Oct. 29, 1992

[30] Foreign Application Priority Data

Apr. 9, 1991 [GB] United Kingdom ............. 9107416

[51] Int. Cl.$^6$ ............................................. G10K 11/16
[52] U.S. Cl. ............................................. 381/71
[58] Field of Search ................... 381/71; 415/119; 267/136; 379/410, 411

[56] References Cited

U.S. PATENT DOCUMENTS

| | | | |
|---|---|---|---|
| 4,417,098 | 11/1983 | Chaplin et al. | 381/71 |
| 4,582,963 | 4/1986 | Danstrom | 379/411 |
| 4,782,459 | 11/1988 | Johnston | 379/411 |
| 4,894,820 | 1/1990 | Miyamoto et al. | 379/410 |
| 4,937,813 | 6/1990 | Schenk | 379/410 |
| 5,359,656 | 10/1994 | Kim | 379/411 |

*Primary Examiner*—Forester W. Isen
*Attorney, Agent, or Firm*—James W. Hiney

[57] ABSTRACT

Primary vibrations (N), e.g. acoustic noise or vibration from a source thereof such as a motor, are cancelled by secondary vibrations (C) produced by an actuator (2) driven by a controller (3) that is responsive to an error signal (E) detected by a detector (4) and representative of the residual or difference between the primary and secondary vibrations. The controller samples the error signal (E) during successive sampling periods determined by a synchronising signal (syn) taken from the motor. The secondary vibrations $C_{n+1}$ for a sampling period $n+1$ are determined as follows: $C_{n+1} = C_n - \mu E_n \text{SGN}[1/\overline{H}]$, where $C_n$ represents the secondary vibrations produced during a preceding sampling period (n); $E_n$ represents the detected error signal for said preceding period n, H represents the transfer coefficient between the actuator (2) and the detector (4) and $\mu$ is a scaling factor where $0 \leq \mu \leq 1$. The apparatus is in one embodiment configured as an add-on unit for a personal computer (PC) including circuit board which fits into an expansion slot of the PC.

11 Claims, 2 Drawing Sheets

ACTIVE NOISE REDUCTION

DESCRIPTION

This invention relates to apparatus for cancelling vibrations, which may be gas, liquid or solid-borne, by nulling primary vibrations, at least in part, with specially generated cancelling or secondary vibrations.

It has been proposed to cancel repetitive noise produced by e.g. an internal combustion engine, by generating cancellation noise with a controller such that the cancellation noise at least in part cancels the repetitive noise produced by the engine. In order to maintain the amplitude and phase of the cancellation noise in opposition to the noise itself, a detector in the form of a microphone is used to determine the residual noise or error between the cancellation noise and the noise itself. The error signal is used to control the output of the controller in accordance with a predetermined algorithm for maintaining a desired cancellation condition. Also, in order to allow the system to track changes in fundamental frequency of the noise, a synchronisation sensor is utilised to provide an indication of the fundamental frequency of the noise e.g. from the speed of rotation of the engine. An example of such an arrangement is disclosed in U.S. Pat. No. 4,417,098 (Chaplin et al). The apparatus may operate in a number of different frequencies each comprising a different harmonic of the fundamental frequency so as to produce cancellation over a broad frequency band.

The algorithm for the controller operates so that samples of the error signal are compared with one another and the output of the controller is modified in accordance with the algorithm to produce a iterative reduction of the error signal. However, as will be described in more detail hereinafter, the iterative technique utilised has a tendancy in conditions close to cancellation, to become unstable as a result of the error signals becoming small, so that the differences between successive error samples can contain a large percentage error that can drive the controller to produce a uncancelled condition.

In accordance with a first aspect of the invention, there is provided improved apparatus for cancelling vibrations wherein the controller is operated in accordance with an improved algorithm that is less prone to drive the apparatus out of the cancelled condition.

In accordance with a second aspect of the invention, there is provided improved noise cancellation apparatus implemented by means of an add-on unit for a personal computer (PC). The apparatus is conveniently embodied as a first circuit board for insertion into the expansion slot of a conventional PC, and a second circuit board driven by the first board and conveniently external to the PC, the second board including an output for a cancellation noise signal, an input for a noise error signal and an input for an external synchronisation signal. Also, software is provided, typically on a floppy disc, to configure the PC processor to perform cancellation in accordance with a predetermined algorithm.

The apparatus may also include means for producing demonstration noise waveforms to be cancelled. Such waveforms may simulate the noise produced by e.g. a helicopter or a motor vehicle so that the apparatus can be used as a demonstration device for active noise cancellation.

In order that the invention may be more fully understood an embodiment thereof will now be described by way of example with reference to the accompanying drawings, in which.

Figure 1:
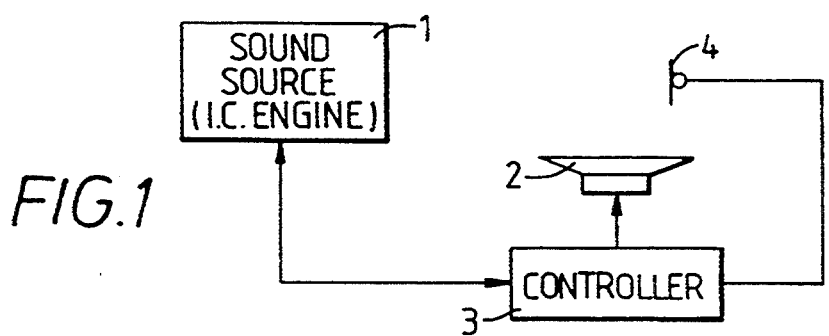
FIG. 1 is a schematic block diagram of an apparatus according to the invention for the active cancellation of repetitive noise from a machine.

Referring firstly to FIG. 1, an active noise reduction apparatus is shown for cancelling noise from a repetitive source such as an internal combustion engine 1. Noise from the engine 1 is cancelled by means of cancellation noise produced by a loudspeaker 2 driven by a controller 3. The difference between the noise from the engine 1 and the cancellation noise 2 is detected as an error signal by means of a microphone 4 and the error signal is applied in a feedback loop to the controller so as to control the cancellation noise produced by the loudspeaker in a manner to minimise the error signal.

The controller also receives a synchronisation signal syn from the engine 1 indicative of its fundamental frequency. The synchronisation signal syn is typically produced by means of tachometer and thus comprises a train of pulses at a frequency indicative of the engine's fundamental frequency. It will be appreciated that the signal syn will vary as a function of engine speed and thus permits the controller the track the speed variations.

The apparatus operates in the frequency domain i.e. cancellation is carried out for a particular frequency harmonic of the signal syn. In practice, cancellation is carried out at a plurality of harmonics so as to achieve cancellation over a broad frequency band. However, for the purposes of this discussion a single harmonic will be considered.

Figure 2:
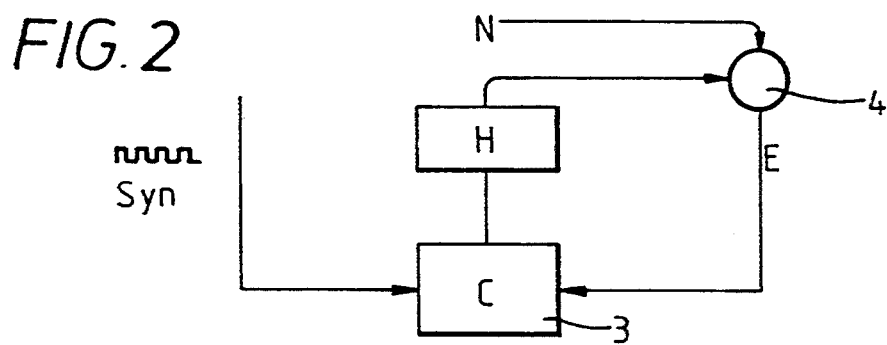
FIG. 2 is a schematic functional diagram for the signals discussed in relation to FIG. 1.

Referring now to FIG. 2, in the case of constant repetitive noise from the engine 1, the controller 3 produces an output signal $\overline{C}$ which is received at the microphone 4 after having been modified according to a transfer function $\overline{H}$ dependent upon characteristics of the loudspeaker 2, the microphone 4 and the acoustic environment between the loudspeaker and the microphone. The noise $\overline{N}$ from the engine is for the purpose of this initial discussion assumed to be constant.

The error signal $\overline{E}$ produced by the microphone 4 can thus be expressed as follows:

$$\overline{E} = \overline{C}\overline{H} + \overline{N} \qquad (1)$$

It will be appreciated that since all the variables expressed in equation (1) represent wave functions, they are actually complex numbers of the form:

$$y = a + ib \text{ where } i = \sqrt{-1} \qquad (2)$$

In use of the apparatus, the error signal $\overline{E}$ is successively sampled at a rate selected to be a predetermined harmonic of the synchronisation signal syn, and a number of successive updates of the error signal are thereby formed.

The error signal for successive updates, $n-1, n, n+1$ will now be considered for a single harmonic.

For the nth update:

$$E_n = C_n H + N \qquad (3)$$

For the n-1th update:

$$E_{n-1} = C_{n-1} H + N \qquad (4)$$

For the n+1th update:

$$E_{n+1} = C_{n+1} H + N \qquad (5)$$

Since the noise produced by the engine is repetitive, it is assumed in the following analysis that the noise signal $\overline{N}$ produced by the engine is constant for equations (3), (4) and (5). Similarly, it is initially assumed for the purpose of this analysis that the transfer function $\overline{H}$ does not vary significantly between successive updates.

In order to achieve noise cancellation during the n+1th sample, the controller output $\overline{C}_{n+1}$ should be selected in such a manner that the error signal $\overline{E}_{n+1}$ becomes zero. Setting $\overline{E}_{n+1}$ to zero in equation (5) yields:

$$N = -C_{n+1} H \qquad (6)$$

By substituting equation (6) into equations (3) and (4) it can be shown that:

$$C_{n+1} = C_n - E_n \frac{(C_n - C_{n-1})}{(E_n - E_{n-1})} \qquad (7)$$

and $$H = \frac{(E_n - E_{n-1})}{(C_n - C_{n-1})} \qquad (8)$$

From equation (7), it can be seen that noise cancellation can be achieved by an iterative process in which the noise output $\overline{C}_{n+1}$ is selected in dependence upon the values of $\overline{E}$ and $\overline{C}$ utilised for two previous samplings. In practice, for an adaptive system converging in a few iterations can result in significant errors. To overcome this problem a scale factor $0 < \mu < 1$ is utilised as shown in the following equation $$C_{n+1} = C_n - \mu E_n \frac{(C_n - C_{n-1})}{(E_n - E_{n-1})} \qquad (9)$$

Whilst iteration according to equation (9) will work satisfactorily, a problem remains in that as successive values of $\overline{C}$ converge towards the value to produce the condition $\overline{E} = 0$ the values of the error samples $\overline{E}_n$ and $\overline{E}_{n-1}$ in equation (9) become small so that any spurious fluctuations in the values of these error samples will produce a very large fluctuation in the value of the term $$\mu E_n \frac{(C_n - C_{n-1})}{(E_n - E_{n-1})}$$

Thus, in practice, if cancellation is carried out according to equation (9) it has a tendency spuriously to jump out of the cancelled condition, for example if the value of the transfer function $\overline{H}$ varies. By way of explanation, if the function $\overline{H}$ according to equation (8) is substituted into equation (9) the following relationship is provided $$C_{n+1} = C_n - \frac{\mu E_n}{H} \qquad (10)$$

Thus, if the actual value of H varies, the computed value thereof according to equation (8) no longer holds true and a significant error occurs in equation (10).

It might be thought that the solution to this problem would be to utilise a constant value of $\overline{H}$ in equation (10) for successive samples. However, it is to be recalled that $\overline{C}$, $\overline{E}$, and $\overline{H}$ are all complex numbers having both a modulus and an argument and that the resulting combination thereof according to equation (10) will be represented by the vector combination of the signals concerned. Thus, if a constant value of $\overline{H}$ were utilised the resulting constant argument of $\overline{H}$ would add in a vector sum in some conditions in such a manner as to move away from an iterative convergence since the arguments or phase angles of the vectors concerned would combine in the wrong sense and produce a resultant $$\frac{\mu E_n}{H}$$

which would combine with $\overline{C}_n$ to produce a value of $\overline{C}_{n+1}$ that would tend to move the resulting value of $\overline{E}_{n+1}$ into an out of cancellation condition.

In accordance with the present invention, it has been appreciated that much more reliable convergence of the iteration can be achieved if only the vector sign of $1/\overline{H}$ is considered in equation (10). Thus, equation (10) can be rewritten as follows:

$$C_{n+1} = C_n - \mu E_n \cdot \text{SGN}\left[\frac{1}{H}\right] \qquad (11)$$

It will be appreciated that $1/\overline{H}$ is a complex number and can be expressed as follows:

$$1/H = \pm a \pm ib \qquad (12)$$

Thus, in accordance with the invention, the term $1/\overline{H}$ is computed in such a manner as to determine the sign of the real and imaginary components a and b shown in equation (12). The absolute amplitude information of a and b is then discarded and the term $[1/\overline{H}]$ in equation (10) is replaced by $$(\pm 1 \pm i1)$$

wherein the signs for the real and imaginary components are determined in accordance with the actual signs of a and b of equation (12). Accordingly, upon computation of the term $$\mu E_n \, SGN\left[\frac{1}{H}\right]$$

the resulting vector will have a phase in dependence upon the phase of $1/\overline{H}$, so that the expression will always try to reduce the error, assuming that $\mu$ is selected in such a manner as to produce stable operation. The value of $\mu$ can be selected to optimise convergence. Since the absolute value of $\overline{H}$ is no longer incorporated in the vector product, spurious variations in the value of $\bar{E}_n$ and $\bar{E}_{n-1}$ will not produce large spurious variations in the expression $$\mu \bar{E}_n \, SGN\left[\frac{1}{\bar{H}}\right].$$

As previously explained in relation to equation (8) when the system moves close to cancellation, $\bar{E}_n$ and $\bar{E}_{n-1}$ both become small and the difference between them becomes prone to spurious errors which can produce very large variations in $1/\bar{H}$. In contrast, in accordance with the invention, only the sign of $1/\bar{H}$ is considered so that such large amplitude variations cannot occur. If there is an error in $$SGN\left[\frac{1}{\bar{H}}\right]$$

the resulting error is small and the next operation of the iterative process will produce a correction so that convergence will occur.

As a practical matter, during start up of the noise cancellation process with large error signals $\bar{E}_n$, both the algorithm of equation (10) and (11) will produce a similar result, but as the values of the error signals $\bar{E}_n$ reduce, the potential to get $1/\bar{H}$ wrong becomes more significant which can have a dramatic effect, as previously explained.

An additional problem is that in practice $\bar{H}$ and $\bar{N}$ are not fixed as assumed above, and do actually change with time. $\bar{N}$ changes with engine load and $\bar{H}$ with frequency. Thus, in practice, it is important to evaluate $H$ in such a manner that the spurious fluctuations in $E$ do not substantially degrade the computation. Thus, the invention has the advantage that by computing the sign of $1/\bar{H}$ any errors in $\bar{E}$ have minimal effect on the overall cancellation performance.

The invention also embodies an additional advantage that by computing only the sign of $1/\bar{H}$ the speed of computation can be improved, which is advantageous in terms of processor time. To explain this in more detail, consider the following:

Let $\nabla C = (C_n - C_{n-1})$, and $\nabla E = (E_n - E_{n-1})$

Substituting in equation (8) and inverting:

$$\frac{1}{H} = \frac{\nabla C}{\nabla E} \quad (14)$$

i.e. $\frac{1}{H} = \frac{\nabla C \cdot \nabla E^*}{\nabla E \cdot \nabla E^*}$ where * denotes the complex conjugate.

It will be seen that the denominator of equation (14) is a real number and therefore in order to compute the sign of $1/\bar{H}$, it is only necessary to compute the numerator of the equation. It will be appreciated that division performed by a microprocessor is significantly slower than multiplication and the omission of the division step therefore substantially speeds up the computation process.

Figure 3:
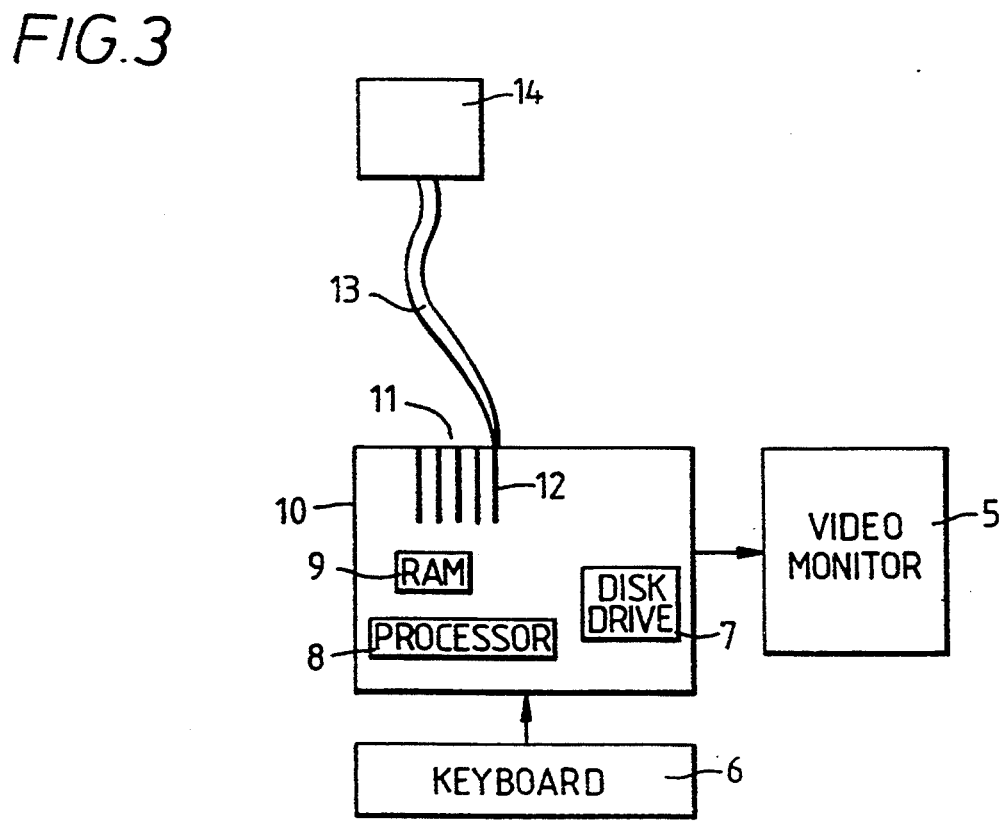
FIG. 3 is a schematic block diagram of an example of the invention for use with a personal computer.

The algorithm described above can be implemented by the use of a purpose built controller. However, advantageously, the invention can be embodied in an add-on unit for a personal computer (PC) as will now be described. Referring to FIG. 3, a conventional personal computer is shown including a video monitor 5, a keyboard 6, and a disc drive 7, processor circuitry 8 and RAM 9 mounted on a circuit board arrangement 10. In a conventional manner, the circuit board arrangement 10 includes expansion slots which permit additional circuitry to be connected to the system bus (not shown). The expansion slots are shown schematically at 11. In accordance with the invention, a first, internal card 12 is fitted into one of the expansion slots and is connected by a ribbon cable 13 to a second, external card 14. The circuit arrangements for the first and second cards 12, 14 are shown in more detail in FIG. 4.

The system is arranged to operate generally in the manner shown in FIG. 1 wherein the noise cancellation algorithm is performed by means of the processor 8 of the PC. The processor is controlled to operate in accordance with the algorithm by means of software from the disc drive 7. Other means of loading software into the computer will be evident to those skilled in the art. Additionally, the system can be used to display an active noise cancellation process without actually cancelling noise produced by a noise source such as the engine 1. Instead, the computer can generate its own noise signal which can be filtered and modified appropriately to simulate noise produced by engines, helicopters and other repetitive noise sources. The simulated noise signal can be fed to a loudspeaker to simulate the presence of the sound source 1. Also, the noise and the resulting cancellation can be displayed on an oscilloscope.

Figure 4:
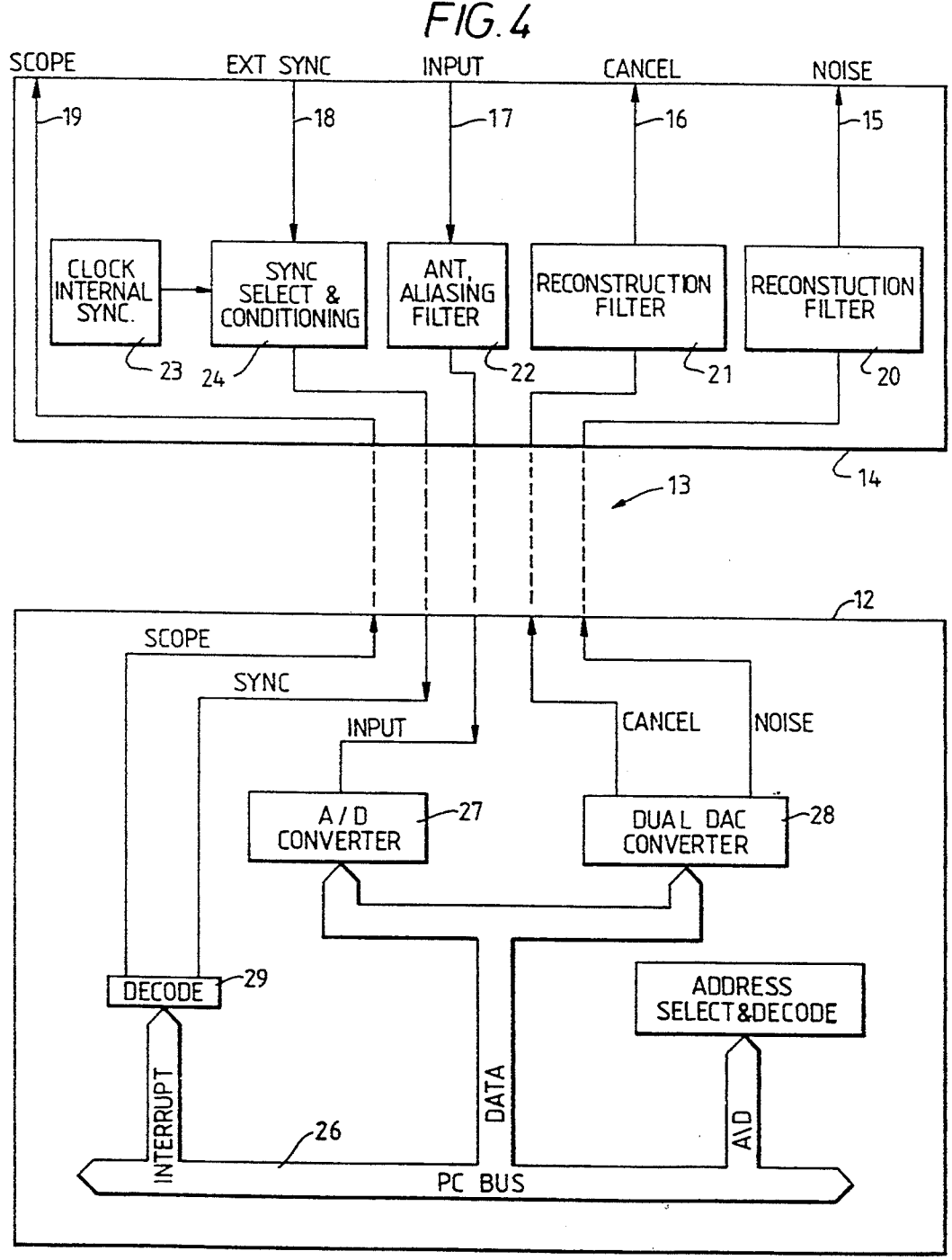
FIG. 4 is a more detailed schematic block diagram of first and second circuit boards used in the apparatus of FIG. 3.

Thus, referring in more detail to FIG. 4, the second, external beard includes an output 15 for simulated noise produced by the PC processor, an output 16 for the cancellation signal $\bar{C}$, an input 17 for the error signal $\bar{E}$, and input 18 for the external synchronisation signal syn and an output 19 for an oscilloscope. The inputs and outputs 15, 16 and 17 are connected through appropriate filters 20, 21, 22, via the cable 13 to the first board 12. The second, external beard 14 also includes an internal clock 23 for generating an internal synchronisation signal syn in the event that an external signal is not introduced on input 18. A synchronisation signal select circuit 24 determines whether an internal or external synchronisation signal is fed to the PC.

Considering now the first, internal board 12, it includes edge connections (not shown) providing an interface to the PC bus which is extended across the board by conductive paths shown schematically at 26. The PC data bus is connected to an analog to digital converter 27 in order to receive a digital conversion of the input error signal applied to input 17. The resulting digitised signal is fed to the data bus of the PC for processing in accordance with the aforesaid algorithm. As a result, digital cancellation signals are provided on the data bus which are fed to a dual digital to analog converter 28, which produces analog signals fed to the cancellation output 16 via filter 21.

In the event that the PC is used to generate noise to be cancelled for demonstration purposes, the digital noise signals are generated by the processor under the control of appropriate software, and are fed to the converter 28 to provide analog signals at output 15 via filter 20.

Interrupts from the PC bus are fed to a decoder 29 so as to provide synchronisation pulses at output 19 for controlling an oscilloscope. The synchronisation pulses are produced at a frequency corresponding to a multiple of the fundamental frequency of the input synchronisation pulses derived either from input 18 or from the internal clock 23.

Thus, in operation, noise cancellation signals $\overline{C}$ are developed at output 16 in response to an input error signal $\overline{E}$ applied to input 17 under the control of a program executed by processor 8 in response to software embodying the algorithm, derived from disc drive 7. For demonstration purposes, synthesized noise signals may also be produced at output 15. The system may operate concurrently for a number of different harmonics of the fundamental frequency defined by the sync pulses. The harmonics may be selected by the user in accordance with a menu driven display shown on the video monitor 5. Whilst the system desirably operates with the algorithm discussed hereinbefore, it may also be used with other noise cancellation algorithms if desired.

Many modifications and variations of the invention will be apparent to those skilled in the art. For example, whilst the algorithm described with reference to equation (11) operates in the frequency domain, it could also be used in a process which operates in the time domain.

Also, whilst in equation (11) the sign of $[1/\overline{H}]$ is considered only in terms of the signs of $(\pm 1 \pm i1)$ the real and imaginary components could also be considered to have zero values as well as $\pm$ values, so as to increase the range of phase angles considered in the algorithm.

Also, the algorithm disclosed with reference to equation (11) can be used to cancel mechanical vibrations rather than acoustic noise as described with reference to FIGS. 1 and 2. For example, the system can be used to attenuate vibrations of a motor such as an electric motor in a domestic appliance. In such a system, a vibration pickup is utilised to sense unwanted motor vibration, and an actuator driven by the controller 3 applies cancelling vibrations to the motor. The system has particular application to a dishwasher.

The algorithm can be run in a single channel as described hereinbefore, or multi-channel systems can be provided with separate algorithms being run in each channel. The system can thus be used for multi-input, multi-output operations. The various channels can be run independently or can be cross-coupled.

Furthermore, in a modification, the syn pulse may be constituted by a single pulse for each motor revolution, and software or hardware may be utilised to produce an appropriate sampling pulse rate signal.

I claim:

1. A method of cancelling primary vibrations using secondary vibrations produced by a secondary source, comprising the steps of:
    utilizing detecting means to detect respective indicia of said primary and said secondary vibrations;
    producing an error signal as a function of the difference between said primary and said secondary vibrations;
    sampling said error signal during successive sampling periods; and
    producing said secondary vibrations for a particular sampling period in dependence upon:
    (a) predetermined indicia of said secondary vibrations produced for a preceding sampling period; and
    (b) a term which is a function of the vector product of:
        (i) a vector signal which is a function of the error signal for a preceding period; and
        (ii) only the sign of a vector signal which is a function of the transfer coefficient between said secondary source and said detecting means.

2. The method of claim 1 wherein the sign of said transfer coefficient vector signal is determined in dependence upon:
    (a) the difference between the secondary vibrations produced for successive preceding sampling periods; and
    (b) the difference between the error signals produced for successive preceding sampling periods.

3. The method of claim 1, wherein said term is scaled by a factor $\mu$ where:

$$0 \leq \mu \leq 1$$

4. The method of claim 3, wherein the secondary vibrations $C_{n+1}$ for a sampling period $n+1$ are determined as follows:

$$C_{n+1} = C_n - \mu E_n \cdot \text{SGN}\left[\frac{1}{\overline{H}}\right]$$

where $C_n$ represents the secondary vibrations produced during a preceding sampling period n; $E_n$ represents the detected error signal for said preceding period n, and H represents said transfer coefficient.

5. The method of claim 4 wherein the sign of said transfer coefficient vector signal $[1/\overline{H}]$ is determined in accordance with the following:

$$\text{SGN}\left[\frac{1}{\overline{H}}\right] = \text{SGN}\left[\frac{(C_n - C_{n-1})}{(E_n - E_{n-1})}\right]$$

wherein $_{n-1}$ denotes a sampling period preceding the period n.

6. The method of claim 5 wherein the sign of said transfer coefficient vector signal is determined in accordance with the following:

$$\text{SGN}\left[\frac{1}{\overline{H}}\right] \alpha \, \text{SGN} \, \nabla C \cdot \nabla E^*$$

where
    $C = (C_n - C_{n-1})$
    $E = (E_n - E_{n-1})$
and * denotes the complex conjugate.

7. The method of claim 1, further comprising the step of producing a cyclic synchronisation signal having a frequency as a function of a repetitive aspect of the primary vibrations, and performing said sampling of the error signal at least one harmonic of said synchronisation signal.

8. Apparatus configured to cancel primary vibrations using secondary vibrations produced by a secondary source, the apparatus comprising;
    detecting means for producing an error signal as a function of the difference between the primary and secondary vibrations; and
    sampling means for sampling said error signal during successive sampling periods and for producing said secondary vibrations for a particular sampling period in dependence upon:
(a) the secondary vibrations produced for a preceding sampling period; and
(b) a term which is a function of the vector product of:
  (i) a vector signal which is a function of the error signal for a preceding period; and
  (ii) only the sign of a vector signal which is a function of the transfer coefficient between the source and said detecting means.

9. The apparatus of claim 8, further comprising:
a motor;
sensor means for deriving a signal having a periodicity as a function of the speed of said motor;
detecting means for detecting the difference between said primary and said secondary vibrations;
controller means for producing signals representative of said secondary vibrations for the motor; and
actuator means, responsive to said signals, for applying said secondary vibrations to the vicinity of said motor.

10. The method of claim 2, wherein said term is scaled by a factor $\mu$ where:

$$0 \leq \mu \leq 1$$

11. The method of claim 2, further comprising the step of producing a cyclic synchronisation signal having a frequency which is a function of a repetitive aspect of the primary vibrations, and performing said sampling of the error signal at least one harmonic of said synchronisation signal.

* * * * *